June 27, 1961  G. KÄBISCH ET AL  2,990,238
METHOD OF EXTRACTING SOLIDS-FREE LIQUID REACTION
PRODUCTS FROM A REACTION AREA CONTAINING THEREIN
DISPERSED SOLID CATALYTIC MATERIAL
Filed Oct. 23, 1957  3 Sheets-Sheet 1
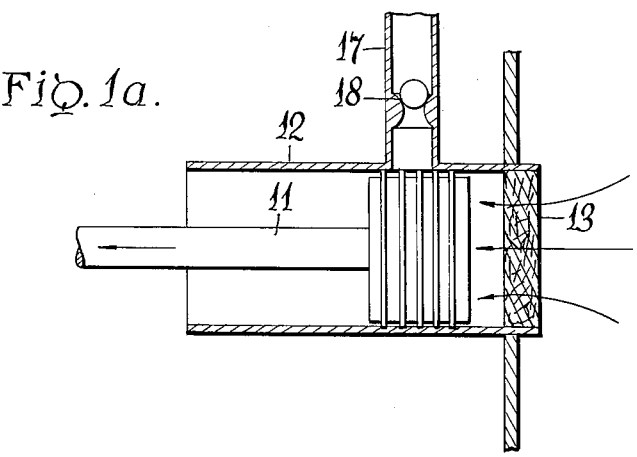
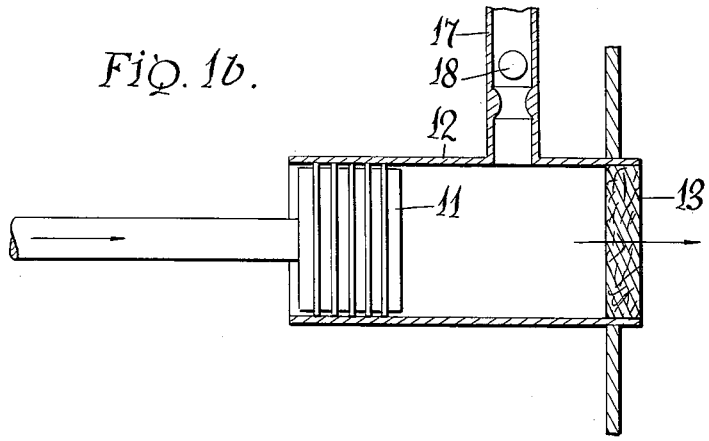
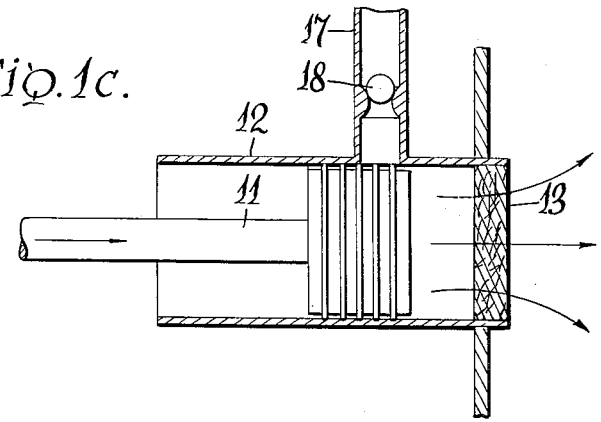
INVENTORS.
Gerhard Käbisch
BY Albert Gross &
Helmut Bruenner.
Beau, Brooks, Buckley & Beau
ATTORNEYS.

June 27, 1961 G. KÄBISCH ET AL 2,990,238
METHOD OF EXTRACTING SOLIDS-FREE LIQUID REACTION
PRODUCTS FROM A REACTION AREA CONTAINING THEREIN
DISPERSED SOLID CATALYTIC MATERIAL
Filed Oct. 23, 1957 3 Sheets-Sheet 2
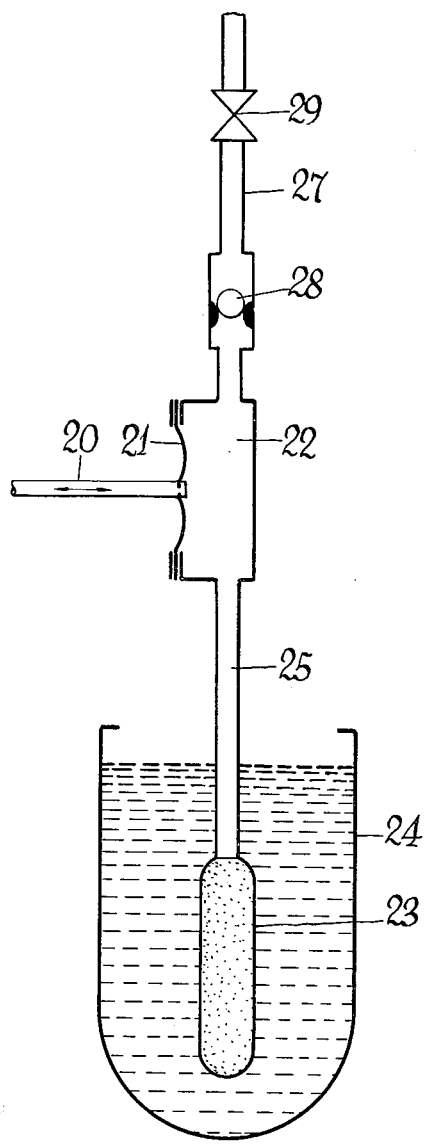
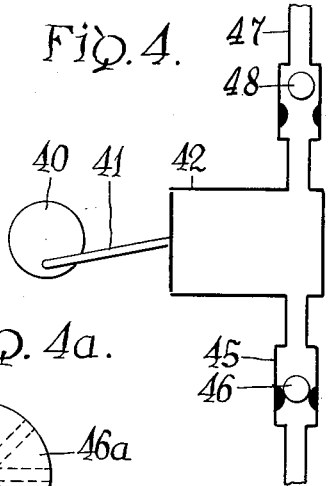
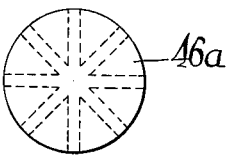
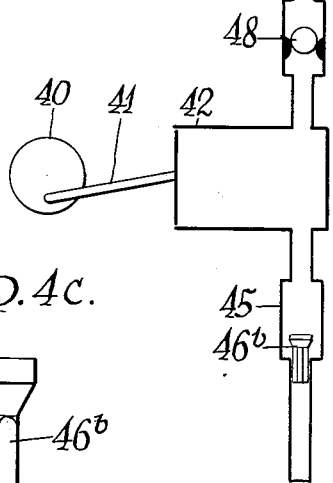
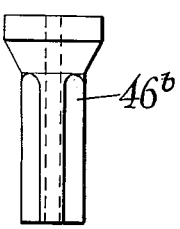
INVENTORS
Gerhard Käbisch
Albert Gross &
BY Helmut Bruenner
Bean, Brooks, Buckley & Bean
ATTORNEYS.

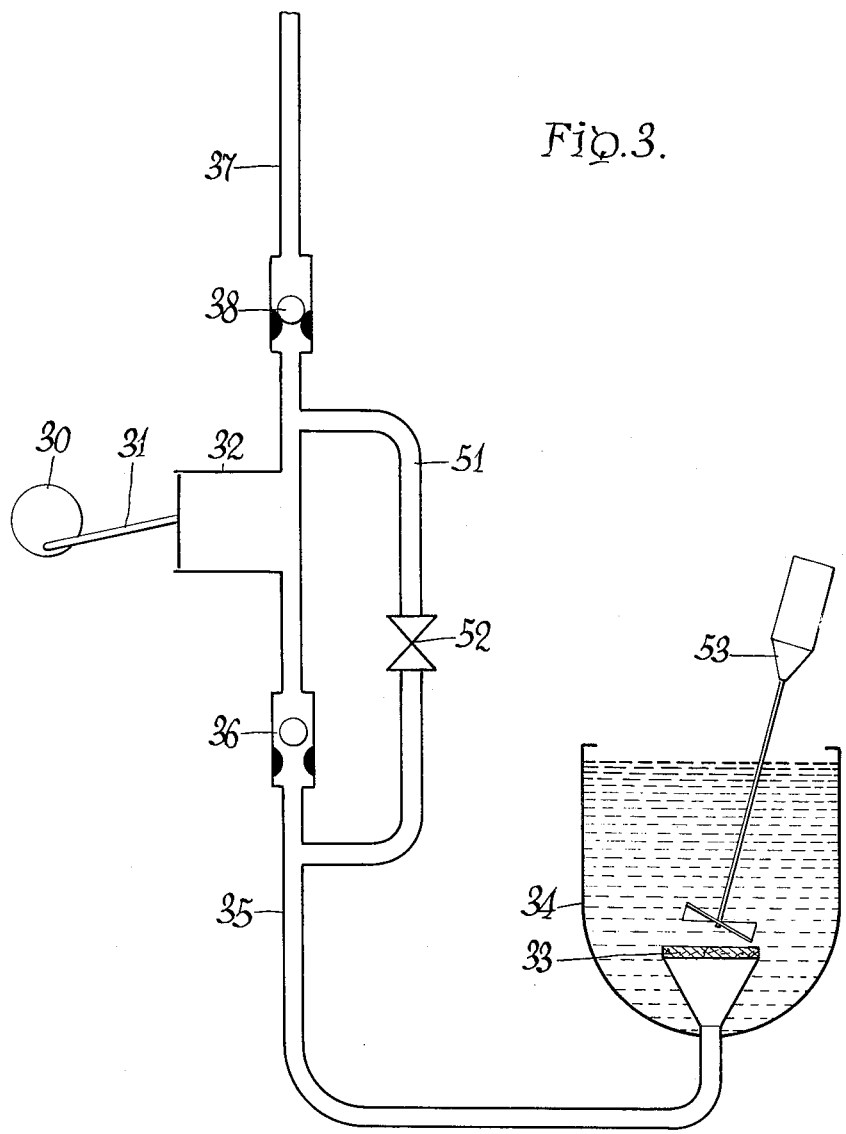

United States Patent Office 2,990,238
Patented June 27, 1961

2,990,238
METHOD OF EXTRACTING SOLIDS-FREE LIQUID REACTION PRODUCTS FROM A REACTION AREA CONTAINING THEREIN DISPERSED SOLID CATALYTIC MATERIAL
Gerhard Käbisch, Rheinfelden, Baden, Albert Gross, Frankfurt am Main, and Helmut Brünner, Rheinfelden, Baden, Germany, assignors to Food Machinery and Chemical Corporation
Filed Oct. 23, 1957, Ser. No. 691,841
Claims priority, application Germany Nov. 9, 1956
2 Claims. (Cl. 23—1)

A procedure that is frequently carried out in the process technique is the conversion of liquids with liquids (or gases with liquids or the conversion of a liquid) in the presence of solid bodies, which are distributed coarsely or finely in the medium in question or are firmly arranged in a part of the reaction vessel and possibly catalyze the desired reactions. Examples of this kind are catalytic hydrogenations, dehydrations or even acid-based catalytic reactions with ion exchangers.

If such a reaction is to be made to be continuous, it is necessary to retain the catalyzer whose effectiveness is sometimes of long duration, within the reaction chamber and to extract from the reaction container a solids-free liquid in the same manner as new—not yet reacted—liquid is being added to the reaction container. This procedure can be performed in such a way that the solid catalyzer is precipitated in centrifuges or hydrocyclones which are connected after the reaction vessel, and added again to the reaction vessel. The above, frequently used procedure is not only involved and exerts a lot of energy, but the desired result is at times only partially accomplished, because the solid catalyzer can not be precipitated fully. In such cases it is necessary to extract a solids-free liquid from the reaction area by installation of filter candles in the reaction vessel using excess pressure, or by extracting the liquid under vacuum through filter layers. The last two procedures have the disadvantage that the filter layers used for phase separation will plug up in time, making a cleaning or exchange necessary.

It was found that chemical reactions in the presence of at least one liquid phase, in which a solid body is distributed, can be performed continuously without changing the pressure conditions and without complicated equipment if in the reaction area filter layers are installed through which certain quantities of liquid containing no solids can continuously be extracted from the reaction area, while the solid substance dispersed in the liquid remains in the reaction area. The advantage of this procedure consists in the fact that it is possible, according to this invention, to recirculate a certain part of the already solids-free liquid through the filter layer.

According to the invention, the extraction of the solids-free liquid from the reaction area may be accomplished with the help of one or several pumps, which are working at 1 to 500, preferably 10 to 200 strokes per minute and through which, during a pressure stroke, a certain amount of the liquid already free from solids is pressed back again through the filter layer into the reaction area. That way the filter layer is flushed with every squeezing and plugging-up by particles of solids is prevented. At the same time continuous operation of the process is in that way maintained.

To carry out this process, a pumping device is required, characterized by one or several passages on the suction side which are to remain open also during the pressure stroke.

A preferred way of operation consists of a device which is built into the equipment and with the help of which the quantity of the liquid to be pressed back through the suction line can be adjusted accurately.

In FIG. 1, piston 11 and cylinder 12 of a piston pump are shown. Filter plate 13 is installed on the suction side; the pressure line is called 17 and the pressure valve 18. At the start of the suction (FIG. 1a) piston 11 moves in the direction of the arrow and through filter plate 13 pulls solidless liquid into cylinder 12. In the pressure phase (FIG. 1b) piston 11 moves toward filter plate 13 and a part or practically all of the liquid is being carried away through pressure line 17 with pressure valve 18 open. At the same time another part can be pressed back through filter plate 13. As soon as the pressure stroke has advanced to a point where piston 11 seals off pressure line 17 (FIG. 1c), then the entire amount of liquid still contained in area 12 located between pressure line 17 and filter plate 13 is pressed back through filter plate 13. The ratio between the amount of liquid that is carried away to that pressed back for flushing may be varied in different ways, for instance, by changing the location of pressuure line 17 on cylinder 18, by using a finer or a coarser filter 13 or by installing a reducing valve (not shown) in pressure line 17.

In the arrangement as shown in FIGURE 2 the transportation of the liquid takes place with the help of diaphragm pump 20/21/22. Through diaphragm 23 liquid is being transported from vessel 24 into suction line 25 and chamber 22. With a pressure stroke part of the liquid containing no solids is carried away through pressure line 27 with pressure valve 28 open. The ratio between the amount of liquid flowing through line 27 to that pressed back through diaphragm 23 can be adjusted by opening or closing reduction valve 29 installed in pressure line 27.

In FIG. 3, parts 30, 31 and 32 are to represent the parts of a diaphragm or a piston pump. The suction stroke causes liquid being sucked through diaphragm 33 from reaction vessel 34 into suction line 35. Suction valve 36 is open in this case. Through pressure line 37 a certain amount of the solidless liquid is removed during the pressure stroke with pressure valve 38 open and suction valve 36 closed, the other part of this liquid returns by way of by-pass line 51 and is used for flushing of diaphragm 33. The desired amount of flush liquid is obtained by suitable adjustment of valve 52 installed in by-pass line 51.

In many cases it is recommended or even necessary to maintain the liquid containing the solids in vigorous agitation during the filter process by employing suitable measures. As may be seen from FIG. 3, such a measure may consist of agitator 53 as is used here, which is keeping the liquid entering vessel 34 and leaving through diaphragm 33 in constant agitation and can serve at the same time to prevent an undesirable early settling of the suspended particles.

With the device as shown in FIG. 3, the process can be worked also as follows: reducing valve 52 is closed and the pump is run first without rinsing exclusively for the purpose of carrying the solidless liquid away. Only once in a while after several pressure and suction strokes valve 52 is opened once during a pressure stroke and thus rinsed. If the pressure of the liquid above pressure valve 38 is greater than the resistance of diaphragm 33, the entire amount of liquid brought up with the suction stroke during this single pressure stroke is pressed back again. A complete squeezing back can also be accomplished with the help of a second reducing valve (not shown), which is installed in pressure line 37 and kept closed during flushing. It is self-understood that the process can also be worked in such a way that for the ratio between the moving of the liquid to the rinsing, in place of the different numbers of strokes, different periods of time be used, for instance, that the reducing valve be kept closed for (a) minutes and it then be opened for a period of (b) minutes. However, continuous operation is preferred, i.e. continuous pressing away and continuous rinsing.

In FIGURE 4, 40/41/42 are the main parts of a diaphragm or a piston pump. The suction line and the suction valve are marked 45 and 46, the pressure line and the pressure valve 47 and 48. Suction valve 46 is constructed in such a way that it is intentionally untight during the pressure stroke. This is achieved by a certain construction of the flexible sealing part of the suction valve. For instance, according to FIG. 4a, a sealing ball 46a with several axial openings can be used, or, according to FIG. 4b, a conical valve 46b with a longitudinal channel. In both cases liquid is pressed back into lines 45 during the pressure stroke through the channels of the flexible, now firmly pressed-on seals 46a and 46b, in order to flush the filter layers (43, not shown).

The process, according to the invention, is being illustrated by the following example, describing a typical hydrogenation of a solution in the presence of suspension catalyzers.

*Example*

To a 10-liter size container provided with an agitator holding 6 liters of an ethylanthraquinone solution of 10 weight percent in a mixture of 40 volume percent benzol and 60 volume percent diisobutyl carbinol, a conventional hydrogenation catalyzer (for instance Raney nickel, palladium on a carrier) is added and hydrogenated at a temperature of 30°. After the desired amount, e.g. about 50%, of the ethylanthraquinone have been hydrogenated to the corresponding anthrahydroquinine, the hydrogenation is continued constantly in such a way that always as much fresh solution is added to the reaction vessel as hydrogenated solution is extracted with the help of the filter pump through a diaphragm located in the liquid area. The filter pump in question works with 50 strokes per minute and is adjusted in such a way that ⅔ of the amount of liquid brought up by suction are used for moving the liquid away and ⅓ for flushing back of the diaphragm.

In order to obtain the full benefits of the present process, the solids, e.g. catalyst, to be separated should have a particle size of about 0.001 mm. to 0.833 mm., and preferably about 0.001 to 0.1 mm. Furthermore, it has been found preferable to return through the filter or diaphragm during the pressure stroke, about 20–70% of the liquid removed during the suction stroke, to assure adequate flushing of the filter or diaphragm.

What is claimed is:

1. In a process wherein reactant compounds are dissolved in a liquid reaction medium and catalytically reacted in a reaction area containing finely divided catalytic solids uniformly suspended in said liquid medium, the improvement which comprises extracting a predetermined quantity of solids-free liquid from said reaction area through a filter layer with the aid of a pump working at from 1 to 500 suction and pressure strokes per minute, accumulating finely divided catalytic solids on the reaction area side of the filter layer, removing a portion of said extracted solids-free liquid, periodically returning the remaining portion of said solids-free liquid on the pump pressure stroke back from the suction side through the filter layer and into the reaction area to dislodge said catalytic solids from the filter layer into the reaction area, and thus retaining said catalytic solids within said reaction area in a constantly suspended and dispersed condition.

2. In the anthraquinone process for producing hydrogen peroxide wherein an anthraquinone compound dissolved in a solvent mixture is catalytically reduced with hydrogen to form the corresponding anthrahydroquinone, said reduction taking place in a reaction area containing finely divided catalytic solids suspended in said solvent mixture, the improvement which comprises extracting a predetermined quantity of solids-free liquid from said reaction area through a filter layer with the aid of a pump working at from 1 to 500 suction and pressure strokes per minute, accumulating finely divided catalytic solids on the reaction area side of the filter layer, removing a portion of said extracted solids-free liquid, periodically returning the remaining portion of said solids-free liquid on the pump pressure stroke back from the suction side through the filter layer and into the reaction area to dislodge said catalytic solids from the filter layer into the reaction area, and thus retaining said catalytic solids within said reaction area in a constantly suspended and dispersed condition.

References Cited in the file of this patent

UNITED STATES PATENTS

| | | |
|---|---|---|
| 2,627,979 | Lamb | Feb. 10, 1953 |
| 2,657,980 | Sprauer | Nov. 3, 1953 |

UNITED STATES PATENT OFFICE
CERTIFICATE OF CORRECTION

Patent No. 2,990,238                                   June 27, 1961

Gerhard Käbisch et al.

It is hereby certified that error appears in the above numbered patent requiring correction and that the said Letters Patent should read as corrected below.

In the grant, line 2, and in the heading to the printed specification, line 7, for "Brünner", each occurrence, read -- Bruenner --; column 2, line 21, for "pressuure" read -- pressure --; column 4, line 18, for "into", second occurrence, read -- to --.

Signed and sealed this 21st day of November 1961.

(SEAL)
Attest:

ERNEST W. SWIDER
Attesting Officer

DAVID L. LADD
Commissioner of Patents

USCOMM-DC